Aug. 5, 1958

E. C. DOUGHTY, JR 2,846,627

HIGH VOLTAGE CONDENSER

Filed Jan. 18, 1957

*INVENTOR.*
EDWARD C. DOUGHTY JR.
BY
*Connolly and Hutz*
HIS ATTORNEYS

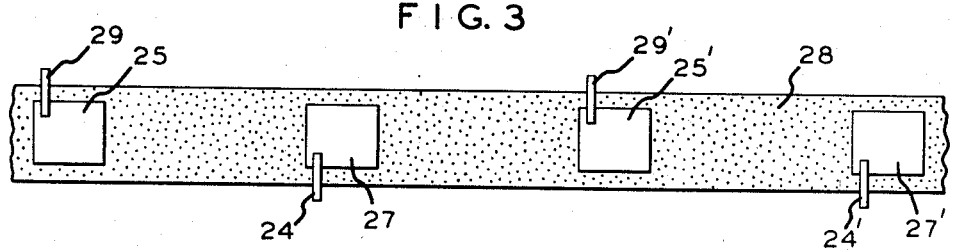
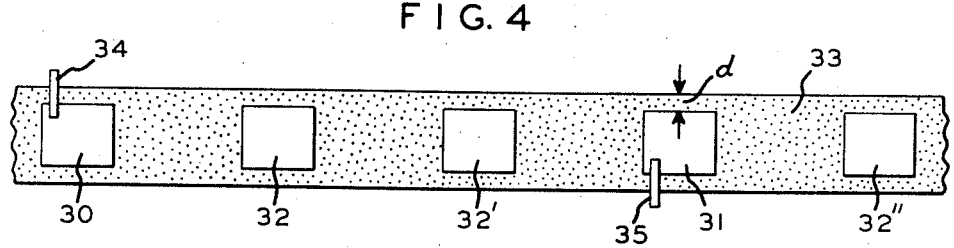
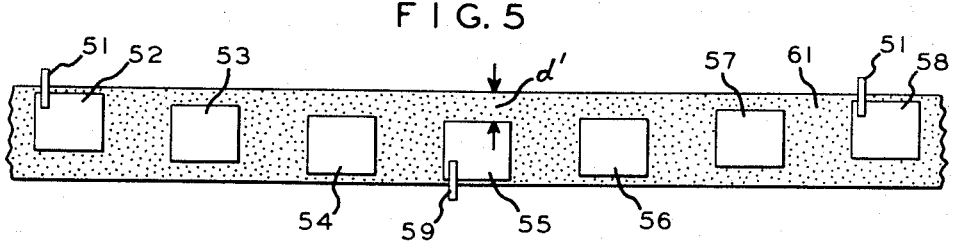

Aug. 5, 1958  E. C. DOUGHTY, JR  2,846,627
HIGH VOLTAGE CONDENSER
Filed Jan. 18, 1957  3 Sheets-Sheet 3

INVENTOR.
EDWARD C. DOUGHTY JR.
BY
Connolly and Hutz
HIS ATTORNEYS

United States Patent Office 2,846,627
Patented Aug. 5, 1958

2,846,627

HIGH VOLTAGE CONDENSER

Edward C. Doughty, Jr., Williamstown, Mass., assignor to Sprague Electric Company, North Adams, Mass., a corporation of Massachusetts Application January 18, 1957, Serial No. 635,014

3 Claims. (Cl. 317—242)

This invention relates to improved high voltage electrical condensers and more specifically to such condensers which are encased in vitreous tubes with metal end closures. These condensers are generally known as ferrule type condensers.

This application is in part a continuation of copending application Serial No. 531,952 filed September 1, 1955 (now abandoned), which in turn is in part a continuation of application Serial No. 229,686, filed June 4, 1951 (now abandoned), which in turn is in part a continuation of Patent No. 2,555,326 granted June 5, 1951, on application Serial No. 677,210 filed June 17, 1946. In this patent corona shields are described for use in the above type of condensers to reduce undesired corona effects.

It is an object of this invention to provide a more highly improved ferrule type of high voltage condenser construction which is simpler to manufacture than prior art condensers of this type.

The present invention is an improvement over the ferrule type condenser mentioned in the above cited parent application in that only one corona shield is used in each condenser. The electrically functioning portion of the condenser, usually a wound condenser section or unit, can be subdivided in the form of a number of small individual convolutely wound condenser units or sections interconnected in series, or of a single wound section of the type disclosed in the now abandoned Robinson et al. application Serial No. 559,388, and referred to the above-identified patent.

The various embodiments of the invention will be apparent from the drawings in which:

Figs. 3, 4 and 5 illustrate in diagrammatic form different manners for winding condenser units for use with the invention;

Figure 1:
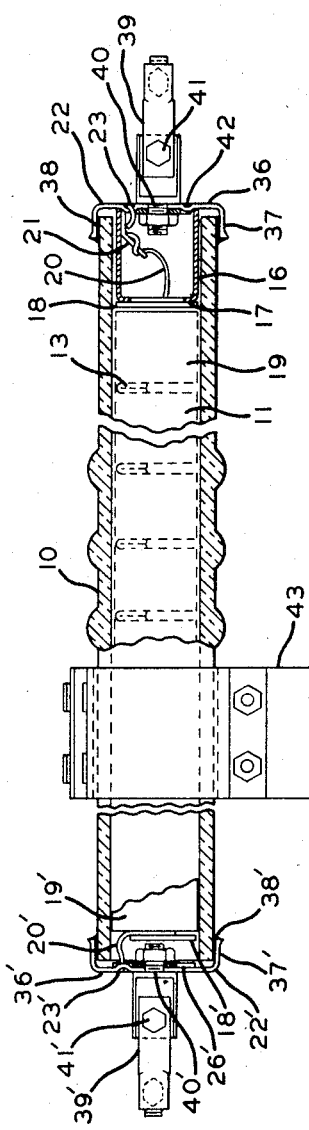
Fig. 1 is a view partly in section of a complete ferrule type of condenser construction illustrating the present invention.

Referring more specifically to Fig. 1, 10 designates a glass tube, preferably of the borosilicate or Pyrex variety, containing a number of convolutely wound condenser units or sections 11. These sections are preferably formed in one of the manners indicated below.

The sections 11 are attached to one another in series by means of tabs 12 and inserted into the tube 10 so as to produce a joint 13 within the tube. A convenient method of attachment is illustrated in Fig. 2. Here the tabs 12 projecting from the flat sides of two convolutely wound condenser units 11 are soldered together so that the sides of the cylindrical units 11 touch one another. When the units are stacked for insertion within the tube, the joined tabs bend at 14, enabling the stack to be formed substantially as indicated by the dotted unit 15 and the unit 11 below it in Fig. 2. It is to be understood that tabs 12 project from opposite sides of the units 11 as terminals of opposite polarity and that they are connected to provide a series-connected chain of units 11.

The condenser section or unit 19 at one end of the chain is spaced from the end of the tube 10 by means of a cylindrical metallic corona shield 16, fitting closely within the tube 10. The end of the shield that faces the end condenser unit 19 is provided with a flange 17 which bears against a thin insulation member 18 between the shield 16 and the section 19.

A length of wire 20 is attached to the outer terminal tab on the condenser unit 19 through a suitable notch or opening in the insulation disc 18 and extends to a clip 21 held on the corona shield 16, and to an end cap 22 through an opening 23. Any suitable means of attachment, such as soldering, may be used. On the other end of the condenser a wire 20' is attached to the terminal tab of the last condenser element 19' and to the end cap 22' at 23'. An insulation disc 18' can be used to separate an inwardly projecting stud 39' on end cap 22' from the end of unit 19', and this combination can serve to position one end of the stack of condenser sections 11 within the tube 10.

The end caps 22 and 22' are both of similar construction, and are both provided with central circular flat portions 36 and 36' surrounded by flanges 37 and 37'. The dimensions of the caps are such that they fit closely over the ends of the tube 10, where they are secured by hermetic solder seals 38 and 38' between the caps 22 and 22' and the tube 10. The seals 38 and 38' between the glass tube and the metal cap may be formed in any one of several known ways. Both the Barshdorf Patent No. 2,449,759 and the Nazzewski Patent No. 2,386,628 show effective methods of forming such a seal. Studs 39 and 39' are bolted to the caps 22 and 22' at 40 and 40' so as to be in electrical contact with the caps. Suitable terminals 41 and 41' are provided on the studs for connection of the complete condenser into an electric circuit.

In the cap 22 there is provided an aperture 42 which is used to impregnate and fill the entire condenser with oil or other suitable dielectric, after it has been completely assembled. This hole 42 is closed with solder after the condenser has been so filled.

Bracket 43 is clamped around tube 10 to provide mounting means for the entire condenser, and to effectively act as an electric shield between the two ends of the housing to prevent corona between the end caps. Bracket 43 is preferably constructed of metal because of the mechanical considerations of weight and wear. However, plastic or wood may be employed for the bracket, in that at the high carrier frequencies present in the power lines systems in which this condenser is used only a slight degree of conductivity is required to permit the passage of sudden surges such as occur during a lightning strike. Applicant has discovered that proper placement of bracket 43 permits the elimination of the second corona shield shown in his Patent No.

2,555,326. The bracket 43 is mounted on tube 10 well away from the high voltage end which must still be provided with one of applicant's corona shields. Mounted in this position, the bracket is effectively at the same potential as the low voltage end of the condenser, which is nearly ground potential. Since such a mounting effectively shunts out the low voltage end of the condenser during a surge, the need for the other corona shield has been eliminated thereby resulting in savings in unit size and material costs. Whereas corona between the end caps would result in rapid deterioration of the condenser, bracket 43 relieves the unit of such an effect. Mounting of the bracket at the low voltage end of the unit further serves to effectively eliminate stray capacitance between the high voltage end cap and the bracket as well as between the section within the tube 10 covered by the bracket and the bracket. Moreover low mounting of bracket 43 provides an extended leakage path, limited only by the mechanical consideration of stability which prevents mounting at the extreme lower end of the condenser.

Figure 2A:
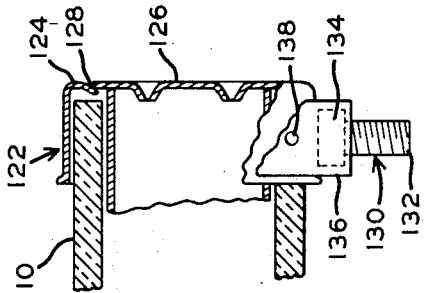
Fig. 2A is a fragmentary sectional view of a portion of the condenser of Fig. 1, showing a modified type of ferrule arrangement.

Fig. 2A shows a modified ferrule arrangement which can be used on either or both ends of the condenser of Fig. 1, for example. In the arrangement of Fig. 2A, the ferrule is formed of a ring 122 of a metal such as brass, for example, having an inwardly directed integral flange 124. This flange is made relatively narrow so that there is a relatively large sized opening in the ferrule which may be of about the same diameter as the internal diameter of tube 10. The opening is covered by a thin plate 126 soldered to the inner edge of the flange. For greater positioning ease the inner edge of flange 124 can be recessed, as at 128, so that the plate 126 is received within the recessed margin. Terminal connection to the ferrule of Fig. 2A is shown as provided by a bolt 130 having a threaded shank 132 extending radially outwardly and having its head 134 clamped against the outer face of ring 122 by an encircling strap 136. This strap need not completely encircle the ring and can be positively connected to the ring as by a series of spot welds such as is indicated at 138.

A feature of the construction of Fig. 2A is that plate 126 acts as a readily releasable safety valve. In outdoor installations it sometimes happens that the high voltage capacitors of the present invention are subjected to terrific current surges, as for example when they or their associated lines are struck by lightning. Such surges sometimes cause the condenser of the present invention to heat up to a degree where the impregnant expands a good deal more than is permitted by the space within tube 10. When this happens the tremendous expansive forces thereby brought into play generally cause the tube to shatter, projecting broken glass in all directions. It appears that the heating caused by such a surge is not sufficient to loosen the ferrule attachment enough to permit the expansion to push out the ferrule without breaking the tube.

With the construction of Fig. 2A, on the other hand, the soldering of plate 126 onto flange 124 by a conventional solder such as one consisting of 60% of tin and 40% of lead by weight, will permit this solder to melt and release the plate so that it is ejected fairly readily. As a result, when the ferrule construction of Fig. 2A is subjected to a direct lightning surge, it will in most cases merely open up at the plate 126 and release the contents of the condenser without breakage of tube 10. Even though the same 60—40 solder is used to hold ring 122 on the end of tube 10 or to hold cap 22 on tube 10, as in Fig. 1, the ring or the cap will not be sufficiently loosened by such surges.

The condenser units or sections 11 may be formed in any suitable manner as by winding a pair of foil ribbons with dielectric spacers in the conventional way, with tabs 12 inserted during the winding. A particularly desirable manner of winding uses a multiplicity of sections such as 11 with each individual section wound so that it has two oppositely polarized electrodes and one intermediate floating or unconnected electrode that is merely capacitively linked with each of the oppositely polarized electrodes. Such a floating electrode construction is shown for example in U. S. Patent No. 2,634,315, granted April 7, 1953. For the purposes of the present invention, however, the electrodes need not be offset with respect to each other and the electrodes are preferably made of equal width all three electrodes being aligned, the dielectric spacers being wider than the electrodes so as to provide a margin of ¼ inch or more beyond each side of the electrodes.

Figure 2B:
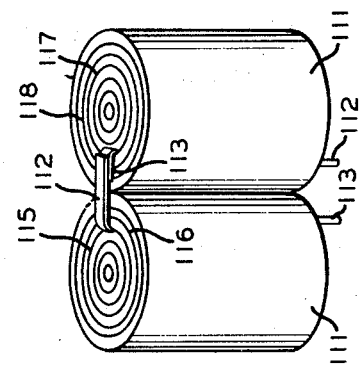
Fig. 2B is a pictorial view similar to Fig. 2 of a modified technique for connecting together individual wound condenser units or sections.
Figure 2:
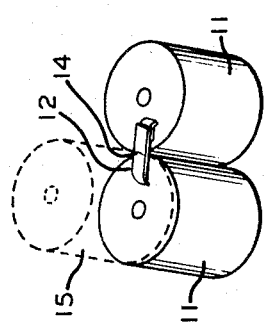
Fig. 2 shows a technique for connecting two or more of the individual condenser units or sections of the condenser of Fig. 1.

This floating electrode construction is particularly desirable since it will provide an extremely low inductance condenser combination. To get the minimum inductance the tabs used to connect the electrodes should be positioned within ½ inch of the internal end of the oppositely polarized electrodes, which should be of about equal length. Fig. 2B illustrates this construction, two condenser sections 111 being shown with their oppositely polarized electrodes indicated schematically. The oppositely polarized electrodes of one section are at 115 and 116, those of the other section being numbered 117 and 118. As shown electrodes 115 (and 117) are wound first and after these electrodes are all wound up, the opposite electrodes 116 (and 118) are then inserted in the winding so that the entire section can be completed. The floating electrodes extend throughout the entire winding of each section from the beginning or inner end of electrodes 115 for example to the terminal or outer end of electrodes 116. In the interest of clarity the floating electrode and the dielectric spacers are not illustrated in Fig. 2B.

Terminal tab 112 is inserted in the winding after electrode 115 is fully wound. Another terminal tab 113 is inserted in the same section at the inner end of electrode 116. The tabs are arranged to extend in opposite directions from the sides of the windings. As illustrated, the outwardly extending portion of tab 112 from one section is bent over and connected as by soldering to a tab 112 or 113 of the adjacent section. The construction is then completed as illustrated in connection with Figs. 1 and 2.

Where a conventional two electrode convolutely wound capacitor is used, low inductance is also obtained by having the tabs connected to their respective electrodes at least ½ inch inwardly in a radial direction from the periphery of the winding. However, not only does the construction of Fig. 2B provide still lower inductance, but it is relatively simple to wind, since the sections can be wound by machine, with both tabs inserted at one stop of the machine, a turn or two being wound by hand while the automatic operation is interrupted.

The condensers of the present invention can also be made in any one of the manners indicated diagrammatically in Figs. 3, 4 and 5. As shown in Fig. 3 a strip of paper dielectric 28 is attached to and wound upon a mandrel (not shown) until sufficient layers of the paper are built up to form a core. Then, an electrode foil 25 is placed on the paper 28 and wound up on the core. It is noted that the foil 25 is of such dimensions that when positioned on the paper 28 an edge margin suitable for insulating the electrode is provided. A terminal tab 29 is either attached to or wound in contact with the electrode 25 in such a manner that it projects from one side of the dielectric 28.

Next, one or more turns of the paper dielectric 28, sufficient to provide the desired amount of dielectric material between electrodes, are wound over the foil 25. An opposing electrode 27 with a tab 24 projecting on the opposite side of the dielectric from the tab 29 is then positioned over the windings and the above steps of the process are repeated. Additional electrode foils 25' and 27' and tabs 24' and 29' are added until the desired condenser unit is obtained. Then the outer turn of the rolled unit is sealed in any suitable manner at its outer edge, as by cement or encircling tape, and removed from the mandrel. Upon joining the various tabs 29 and 29' and 24 and 24' of opposite polarity, with or without fastening as by solder, the condenser is ready for insertion in tube 10. If desired the ends of the condenser unit can be sealed with wax or resin cement for example.

In the example of Fig. 3, a single sheet of dielectric paper or other material may be employed in place of a plurality of the same, and the need of additional winding spindles, etc., in the manufacture of the condenser unit is obviated. In winding the condenser units about the winding mandrel, the electrodes are laid on the single paper spacer at spaced intervals, the length of said electrodes being generally at least equal to the circumference of the partially wound condenser at that instant. Following the winding of each of said electrodes into the condenser, additional layers of the dielectric paper are wound, so that any desired dielectric thickness may be obtained, without wrinkling, shearing, pinching, etc., of the dielectric paper and/or the foil. Terminal tabs may be attached to the electrodes before winding, or one edge of the terminal electrodes may extend over one edge of the paper spacer as in the usual non-inductively wound condenser. This embodiment permits greatly increased dielectric thickness to be attained without the usual difficulties attendant thereto. The electrodes 25 and 25' and the oppositely polarized set 27 and 27' each consist of foils of a length equal to the circumference of the wound condenser and are arranged in spaced relationship on a dielectric spacer 28, the electrodes of similar polarity being interconnected after winding by means of tabs 29 and 29' and 24 and 24', respectively.

Another suitable type of winding incorporates floating electrodes in a construction that is otherwise similar to Fig. 3. These floating electrodes are interposed between the terminal electrodes for the purpose of realizing a substantially uniform voltage through the turns of dielectric. This arrangement is shown in Fig. 4 wherein 33 represents the dielectric spacer laid out flat, as it is before winding. One terminal electrode 30 has a terminal tab 34 attached thereto. Floating electrodes are shown at 32, 32' and 32". Another terminal electrode 31 has a terminal tab 35 extending beyond the edge of the paper 33 on the opposite side with respect to terminal tab 34. One length of the condenser is shown and a condenser containing a plurality of such lengths may be rolled. The number of floating electrodes, and the distance between electrodes may be chosen to fit the need therefor. The floating electrodes may be metallized layers or separate foils on the paper spacer. The width of these electrodes is generally the same as the width of the terminal electrodes. The length of the electrodes is generally sufficient to provide at least one complete turn thereof in the condenser. The paper spacer may be substituted by a resin, glass or other dielectric spacing material. The terminal electrodes may extend over the edge of the foil as in a so-called non-inductive winding, on alternate sides. As is obvious where metallized electrodes are used, they may be interconnected by separately extending them along the margins of the dielectric.

Fig. 5 illustrates a further type of winding. In this figure 61 represents the dielectric spacer upon which, as explained in connection with Fig. 4, are placed terminal electrodes 52, 55 and 58 and floating stress-grading electrodes 53, 54, 56 and 57. The arrangement differs from that described in connection with Fig. 4, in that the terminal electrodes of opposite polarity are laterally displaced so that electrode 52 is located near one edge of spacer 61, while electrode 55 is located near the other edge of the spacer 61. The floating electrodes 53 and 54 are staggered laterally between the edges of the spacer 61 so as to be located at equalizing intervals between the two opposite polarity electrodes 52 and 55. Thus, if the total lateral displacement between terminal electrodes is two inches and if there are two staggered floating electrodes, the lateral displacement between adjacent electrodes, would be ⅔ of an inch. Electrodes of similar polarity may be interconnected by means of tabs 51 and 59, respectively. The dimensions of the electrodes and winding techniques may remain the same as described in connection with Fig. 4.

Instead of having these successive electrodes vary a small amount in length so that each one extends exactly one revolution around the winding's varying radius, the electrodes can be made in two or more different lengths; the shorter or shortest length can be used at the start of the winding and the longer lengths inserted afterwards. So long as each electrode extends at least around one turn, a slight excess length makes no significant difference in construction. However, it does enable the use of only a small number of standard length electrodes so that supply problems and winding difficulties are minimized. Thus, for any of the constructions of the present invention, two sets of foils can be used, one having a length equal to the greatest periphery of the winding and the other being half as long, that is, equal to one turn of the winding when the winding is half completed.

The results obtained in a condenser utilizing the novel construction of Fig. 5 go far beyond those which could be obtained in a condenser constructed according to Fig. 4. This may be readily observed by reference to Figs. 4 and 5, in which the marginal spacing between an inner edge of a terminal electrode and the edge of the dielectric spacer from which terminals of opposite polarity protrude is represented by $d$ and $d'$, respectively. To obtain the optimum insulation resistance of the construction of Fig. 5, the distance $d$ in Fig. 4 would have to be increased an amount at least equal to $d'$ in Fig. 4. Further, and equally important, the construction of Fig. 5 permits manufacture of condensers of higher capacity per unit volume for any given high voltage than any construction heretofore proposed. This may be understood from a consideration of the width of the electrode foils of Fig. 5. It is apparent that for any given width of dielectric spacer and of required marginal spacing $d'$, a wider foil may be employed, since the marginal spacing on the terminal side need not be large, and, in fact, no spacing is required, since the terminal electrode 55 need not be insulated from the exposed side of the unit from which the tab 59 extends. By virtue of this preferred lateral electrode staggering, the effective dielectric width is substantially equal to the electrode width.

The wound condenser produced with the construction of Fig. 5, thus has a maximum voltage breakdown, distributed voltage gradient between terminal electrodes, and high capacity per unit volume. The increase in capacity per unit volume permits, in actual commercial designs, savings in volume (for any given rating) often amounting to 25 to 30%, in addition to the superior qualities of the condenser, e. g. long life, high peak voltage ratings, etc.

As an alternative construction the condenser of the present invention can have a single wide winding used in place of the multiplicity of series-connected units 11. With such a construction, it is preferred to use the windings of Figs. 3, 4 and 5; a floating foil type of winding as described in connection with Figs. 4 and 5 being particularly desirable. With any of these constructions, a final assembly that operates satisfactorily at over 8000 volts between terminals can be provided in a tube 10 about 15 inches long. About twelve series-connected sections (Fig. 2A or 2B) are all that is needed for this type of operation.

Figure 6:
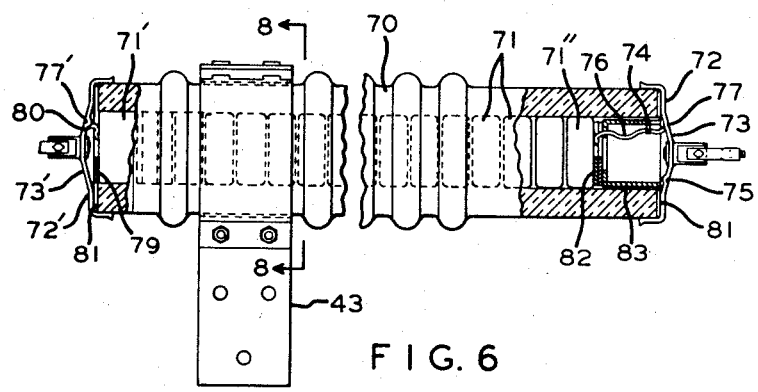
Fig. 6 is a partly sectional view of another complete ferrule type condenser construction which also illustrates the present invention.

In the modification of Fig. 6 there is shown a condenser of slightly higher operating voltage than the condenser shown in Fig. 1. The condenser of Fig. 6 is also composed of a series of individual units or sections 71 connected in series and positioned within a glass tube 70 preferably of the Pyrex or borosilicate variety. It will readily be seen that the unlabelled parts of the condenser unit shown in Fig. 6 are the same as the parts of the condenser shown in Fig. 1; and that the closure structure is different in this modification in that the caps 72 and 72' are provided with conical sections 73 and 73'. The leads 76, 80 from the end condenser sections 71 and 71" are attached to the caps at 77 and 77'. The particular closure 72' is spaced from the tube 70 by means of a ring of insulation such as paper 81. A disc of insulation 79 within ring 81 spaces the unit 71' from the cap member 72'. A corresponding ring 81 is used to space cap 72 from the other end of the tube 70. Several spacers 82 can be inserted between the unit 71 and a corona shield 83. The lead connecting the condenser unit 71 with the cap 72 is attached to a bent out projection on corona shield 83 as indicated at 74.

Figure 7:
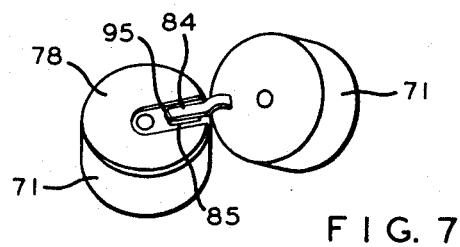
Fig. 7 shows another technique for connecting two or more of the individual condenser units or sections used in either of the complete condenser constructions of Figs. 1 or 6.

The particular method of attaching the elements 71 used in this modification differs from the method shown in Fig. 2, as will be seen in Fig. 7. A dielectric spacer element 78 is positioned between the elements 71 so as to hold these elements at a distance approximately equal to the thickness of the joint formed between the tabs 84 and 85 connecting the two condenser sections or units. These tabs are soldered together in the position indicated in Fig. 7. It will be seen that a cut out segment 95 is provided in the spacers 78 to accommodate the tabs so that a series of units may be stacked in a straight line.

Figure 8:
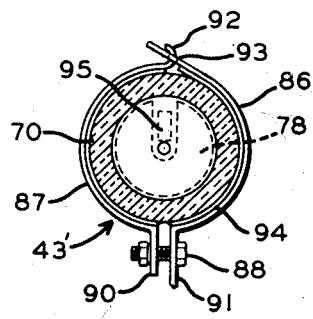
Fig. 8 is a cross-section view of the condenser in Fig. 6 taken at line 8—8.

The sectional view of Fig. 8 shows more clearly a bracket 43' similar to the bracket of Fig. 1, and of two halves 86 and 87 which are clamped together in one side of the tube 70 by means of bolts 88 engaging the flanges 90 and 91. At the opposite side of the tube 70 hooks 92 on the clamp-half 87 project through openings 93 in the section 86, holding these two sections together. The lower portion of the flange 91 is provided with suitable holes used in attaching the condenser to a suitable mounting. The sections 86 and 87 are cushioned against the tube 70 by means of a gasket 94 which, for reasons more fully set forth above, may be of either insulating or conductive material. Gasket 94 functions primarily as a mechanical shock absorbing medium and effectively does not alter the electrical properties of the bracket. The spacer 78 and the segment 95 formed by the tabs 84 and 85 are seen inside the tube 70 in Fig. 8.

Condenser units produced in accordance with this invention are simpler to manufacture than prior art units of the same type. Because of the construction and mounting of the bracket, only one corona shield is sufficient to adequately protect the condenser against failure due to corona effects, and has been found just as effective in this respect as the use of two corona shields in the manner described in prior Patent No. 2,555,326. Even though both ferrules of a condenser may be at a potential with respect to ground, a single corona shield at the higher voltage end gives all the protection that two shields are capable of. It is obvious that a series of identical condenser units or sections may be readily manufactured separately and attached together according to this invention so as to form a stacked series of condenser units or sections which may be easily inserted into a glass tube used in this type of condenser.

The condensers of the present invention are conveniently assembled as by fitting the capacitor section, either of the single or multiple type, within the tubular housing and with the terminal leads attached in place. Either glass or ceramic tubes can be used. The corona shield is then inserted, following which the end caps can be fitted over the ends of the tube, with the lead wires threaded through the corresponding openings in the caps. The end caps are then soldered in place on the tube as by means of the metallized bands, referred to in the above-identified Barschdorf and Nazzewski patents. The terminal leads can now be soldered in place in the cap openings through which they are threaded. Where the condensers are impregnated, the impregnation can be the final stage, one or more end cap openings being left unsealed until it is completed.

It is to be understood that this invention is not limited to the specific embodiments shown, but is only limited by the scope of the appended claims.

What is claimed is:

1. A high voltage condenser having an elongated vitreous tubular housing, a capacitance section in said housing and extending almost its entire length, a single corona shield at one end of the housing, said shield being a metal tube slightly narrower than and fitted within the housing, metal end closures hermetically sealing both ends of the housing and carrying terminal leads to the opposite ends of the section, said metal tube having an inwardly bent flange next to the adjacent end of the section, the other end of the section being closely adjacent that housing end closure, a liquid dielectric impregnant almost completely filling the housing, and a mounting bracket secured around the housing at a point intermediate its ends.

2. The high voltage condenser of claim 1 in which the mounting bracket is secured to the housing at a point adjacent the end of the housing remote from the corona shield.

3. The high voltage condenser of claim 1 in which the section comprises a plurality of convolutely wound condenser units series connected to each other in substantial axial alignment.

No references cited.